United States Patent
Izumino et al.

(10) Patent No.: US 7,473,181 B2
(45) Date of Patent: Jan. 6, 2009

(54) TRIPOD TYPE CONSTANT VELOCITY UNIVERSAL JOINT

(75) Inventors: Junichi Izumino, Iwata (JP); Minoru Ishijima, Iwata (JP)

(73) Assignee: NTN Corporation, Osaka-shi (JP)

(*) Notice: Subject to any disclaimer, the term of this patent is extended or adjusted under 35 U.S.C. 154(b) by 270 days.

(21) Appl. No.: 11/377,423

(22) Filed: Mar. 17, 2006

(65) Prior Publication Data
US 2006/0223642 A1    Oct. 5, 2006

(30) Foreign Application Priority Data
Mar. 31, 2005   (JP) ............................ 2005-102532

(51) Int. Cl.
   *F16D 3/205*   (2006.01)
(52) U.S. Cl. ...................................... 464/111; 464/905
(58) Field of Classification Search ................ 464/111, 464/123, 124, 905
See application file for complete search history.

(56) References Cited

U.S. PATENT DOCUMENTS 5,167,583 A * 12/1992 Bensinger et al. ............ 464/111
2004/0157667 A1 * 8/2004 Ishijima et al. ............. 464/111

FOREIGN PATENT DOCUMENTS

JP       2004/257418       9/2004

* cited by examiner

*Primary Examiner*—Greg Binda
(74) *Attorney, Agent, or Firm*—Wenderoth, Lind & Ponack, L.L.P.

(57) ABSTRACT

The present invention provides a lightweight, compact, and low-cost tripod type constant velocity universal joint while maintaining strength of overall tripod type constant velocity universal joint. The dimensional ratio of each component of the tripod type constant velocity universal joint is set as follows: $0.80<Dor<0.90$, $0.105<Tor<0.115$, $0.025<fir<0.045$, $0.025<t2r<0.075$, $0.53<Dir<0.63$, $0.065<Tir<0.085$, $0.32<Dj1r<0.42$, and $0.32<Dj2r<0.35$. In this event, the subscript "r" means that each dimension is divided by the trunnion journal pitch circle diameter D (=PCD) of the joint.

6 Claims, 5 Drawing Sheets

TRIPOD TYPE CONSTANT VELOCITY UNIVERSAL JOINT

BACKGROUND OF THE INVENTION

1. Field of the Invention

The present invention relates to a tripod type constant velocity universal joint, for example, for use in a drivetrain of an automobile drive system and for transmission of a rotating force at a constant angular velocity between two rotary shafts on a nonlinear line of the automobile drive system.

2. Description of the Background Art

Demand of weight reduction and size reduction of tripod type constant velocity universal joints is increasing to improve automobile mileage. Responding to the demand, a tripod type constant velocity universal joint of, for example, Japanese unexamined patent publication 2004-257418 is proposed. The tripod type constant velocity universal joint set forth in this Japanese unexamined patent publication 2004-257418 is of a double roller type where each outer roller rolls in parallel to a track groove. The journal root portion has a non-circular cross-section in which a diameter in the joint circumferential direction is larger than that in the joint axial direction. This feature brings about lightweight, compactness and reduced cost of the joints while keeping the strength at the root portion of the trunnion journal that tends to be a weakest portion of the trunnion.

However, in the event that an ultimate design is applied to the tripod type constant velocity universal joint of Japanese unexamined patent publication 2004-257418 in order to promote a lightweight compact conversion, it has been found out that it is insufficient to solely make the cross section of the journal root portion noncircular to maintain the strength at the root portion of the trunnion journal. That is, considering the strength of the whole tripod type constant velocity universal joint, it has been found it is difficult to promote a lightweight compact conversion of the whole tripod type constant velocity universal joint unless dimensions of each component, particularly, the shape and the dimensions of the roller cassette and trunnion journal root portion are optimally designed.

SUMMARY OF THE INVENTION

An object of the present invention is to solve the above-mentioned problems and to provide a lightweight, compact, and low-cost tripod type constant velocity universal joint while maintaining the strength of the whole tripod type constant velocity universal joint.

In order to solve the above-mentioned problems, the first aspect of the present invention is a tripod type constant velocity universal joint, which comprises an outer joint member being coupled to and adapted to transmit torque to a first rotary shaft and having track grooves which extend in the axial direction at trisected positions in a circumferential direction on the inner circumferential surface thereof, an inner joint member being coupled to and adapted to transmit torque to a second rotary shaft and comprising a boss directly connected to the second rotary shaft and a journal protruding from the circumferential trisected positions of the boss in the radial direction, and a roller cassette that stands between the outer joint member and the inner joint member to transmit torque and comprising an outer roller that can roll along the track grooves of the outer joint member, an inner roller fitted to the journal of the inner joint member and a plurality of rolling elements disposed between the outer roller and the inner roller, wherein Do denotes the outside diameter of the outer roller, To the radial wall thickness of the outer roller, t1 the collar thickness on the outside of the joint radial side of the outer roller, t2 the collar thickness on the inside of the joint radial side of the outer roller, Di the outside diameter of the inner roller, Ti the wall thickness of the inner roller, Dj 1 the diameter in the joint peripheral direction of the cross-sectional shape at the root portion of trunnion journal, Dj2 the diameter in the joint axial direction of the cross-sectional shape at the joint of trunnion journal, and D the trunnion journal pitch circle diameter (PCD) of the joint; then, in the event that it is defined that the outside diameter ratio of the outer roller Dor=Do/D, wall thickness ratio Tor=To/D, outer collar thickness ratio t1$r$=t1/D, inner collar thickness ratio t2$r$=t2/D, outside diameter ratio of inner roller Dir=Di/D, wall thickness ratio Tir=Ti/D, joint circumferential diameter ratio at the joint of trunnion journal Dj 1$r$=Dj 1/D, and joint axial diameter ratio at the joint of trunnion journal Dj2$r$=Dj2/D, each of the above-mentioned ratios is set to the range of 0.80<Dor<0.90, 0.105<Tor<0.115, 0.025<th<0.045, 0.025<t2$r$<0.075, 0.53<Dir<0.63, 0.065<Tir<0.085, 0.32<Dj1$r$<0.42, and 0.32<Dj2$r$<0.35. In this event, Dor, Tor, tir, t2$r$ denote the ratio of the outer roller dimensions, and Dir and Tir are ratios of the inner roller dimensions. Setting them to the above-mentioned proportions provides a good balance of strength and rigidity of the relevant portions, lightweight compact conversion and low cost conversion, while maintaining the required strength.

Dj1$r$ and Dj2$r$ are ratios of dimensions of the trunnion journal portion. Setting the ratio to the above-mentioned proportions provides the required operating angle of the constant velocity universal joint, a good balance between the strength and the rigidity of the relevant portions, lightweight compact conversion and low cost conversion, while maintaining the required strength.

As mentioned above, setting the dimensional ratio of each component of the constant velocity universal joint to a specified range realizes lightweight, compact, and low-cost constant velocity joints with keeping the strength of overall tripod type constant velocity universal joints.

The second aspect of the present invention lies in that undercuts for the inner roller assembly are provided in the joint circumferential direction on the nearly spherical trunnion journal.

This enables smooth assembly by greatly tilting a roller cassette when the roller cassette is assembled to a trunnion journal.

According to the first and second aspects of the invention, the third aspect of the present invention lies in that the journal root portion has a noncircular cross section whose diameter in the joint circumferential direction is larger than that in the joint axial direction.

This can improve strength in the circumferential direction of the journal neck bottom that is the position most susceptible to the maximum stress when a torque load is applied and can make the joint still more compact.

According to the first through third aspects of the invention, the fourth aspect of the present invention is that the radius of curvature R1 of the journal root portion in the joint circumferential direction is constant over the specified angle range from the top of the joint circumferential direction.

Even in the event that the radius of curvature R1 is made constant throughout a specified angle range, it is possible to achieve small size, light weight, and low cost without sacrificing the maximum operating angle of a joint while maintaining strength at the journal root portion, which is most likely to become the weakest portion of the tripod.

According to the first to fourth aspects of the invention, the fifth aspect of the present invention lies in that the ratio of radius of curvature R1 in the joint circumferential direction of the journal root portion to the radius of curvature R2 in the joint axial direction is set to 2.0<a<6.5 where a denotes the value of the ratio of R1 to R2. In the case of a<2.0, R2 is too large, causing the joint to interfere with a roller cassette 20, and the maximum operating angle of the joint decreases. Consequently, the joint PCD must be increased to avoid interference, which possibly results in an increased outside diameter of the joint. In the case of a>6.5, R2 is too small and the forging formability may be degraded.

According to the first to fifth aspects of the invention; the sixth aspect of the present invention lies in that the ratio of radius of curvature R1 in the joint circumferential direction of the journal root portion to the female spline PCD of the boss is set to 0.13<b<0.25 where b denotes the value of the ratio of R1 to PCD.

In the case of b<0.13, R1 is too small and the strength of the tripod 16 may be possibly decreased. In the case of b>0.25, R1 is too large, causing the joint to interfere with the roller cassette 20 and the maximum operating angle of the joint decreases. Consequently, the joint PCD must be increased to avoid interference, and an increased joint outside diameter may result.

As described above, setting the dimensional ratio of each component of the tripod type constant velocity universal joint to the proper value leads to a tripod type constant velocity universal joint that can satisfy all the requirements of light weight, compactness, and low cost while maintaining the strength of the whole joint.

DETAILED DESCRIPTION OF THE INVENTION

Hereinafter, embodiments of the present invention will now be described in detail with reference to the drawings.

(Basic Configuration of a Tripod Type Constant Velocity Universal Joint)

Figure 3:
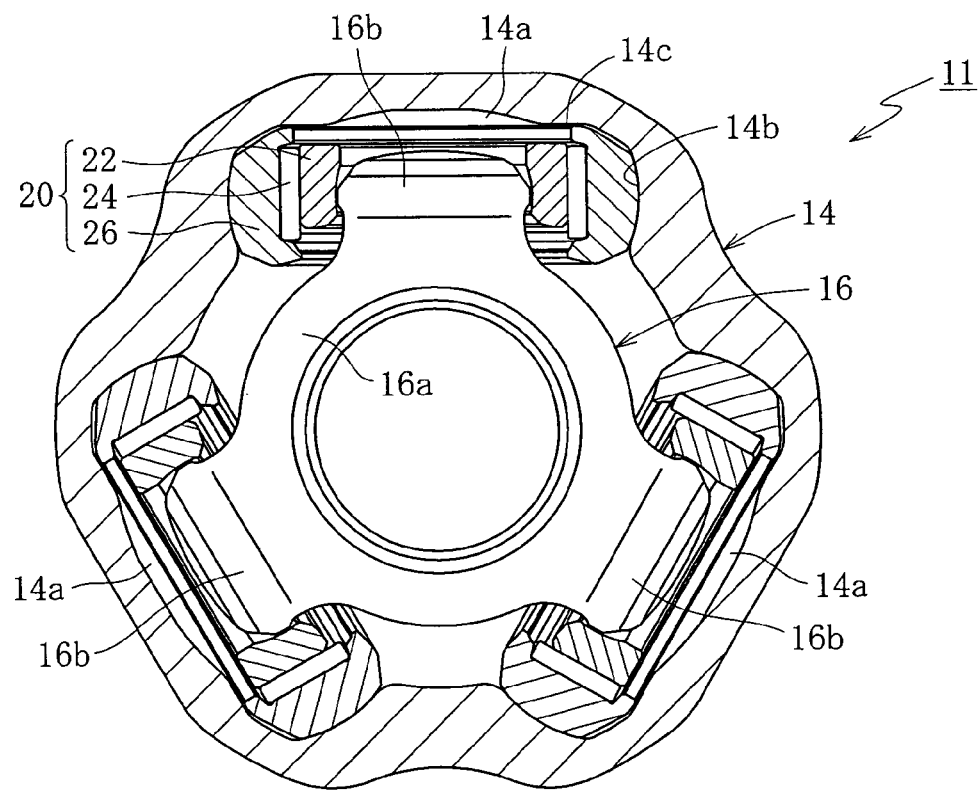
FIG. 3 is a transverse cross sectional view of a tripod type constant velocity universal joint.
Figure 4:
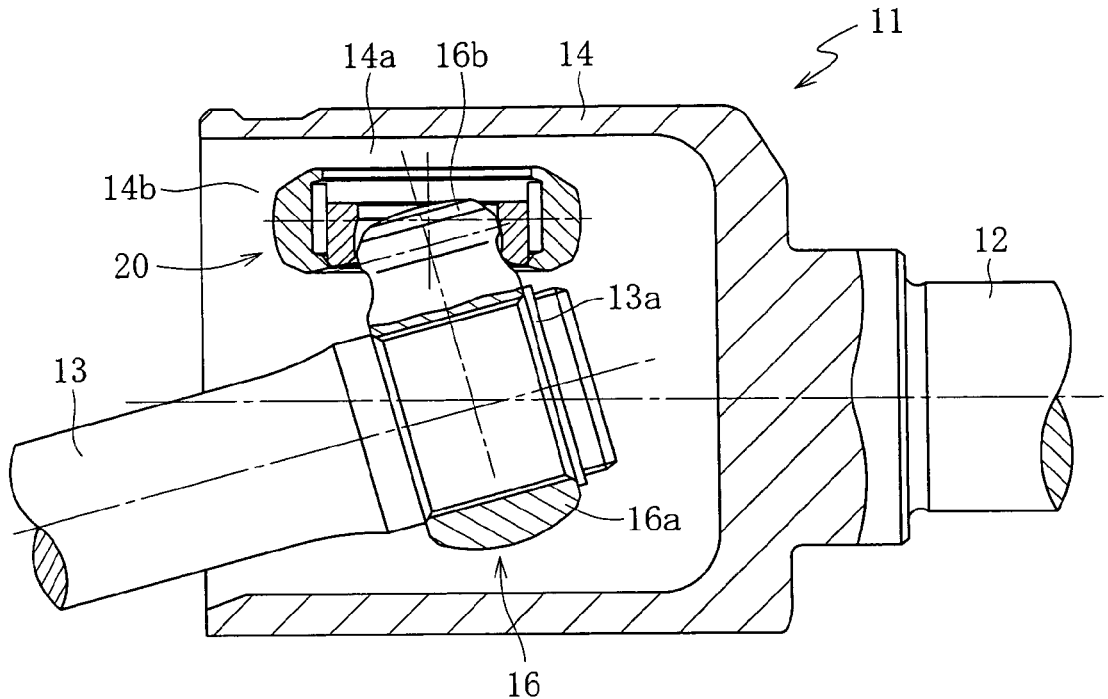
FIG. 4 is a longitudinal cross sectional view of a tripod type constant velocity universal joint.
Figure 5:
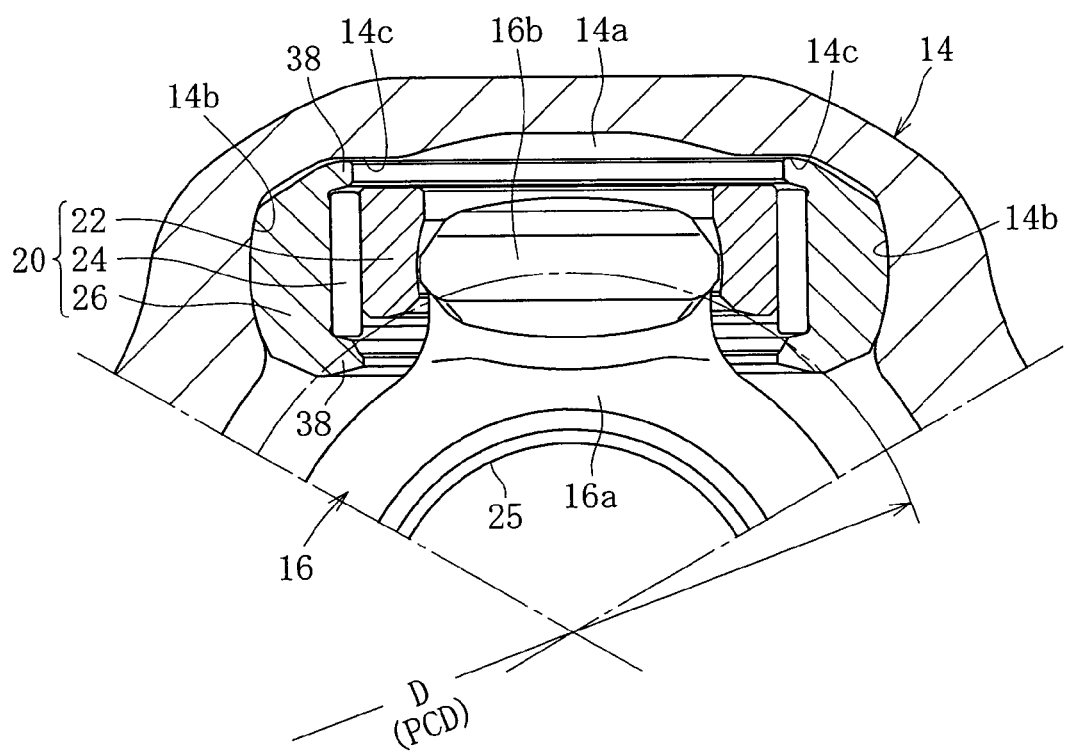
FIG. 5 is an enlarged view of the transverse cross section of the tripod type constant velocity universal joint.
Figure 6:
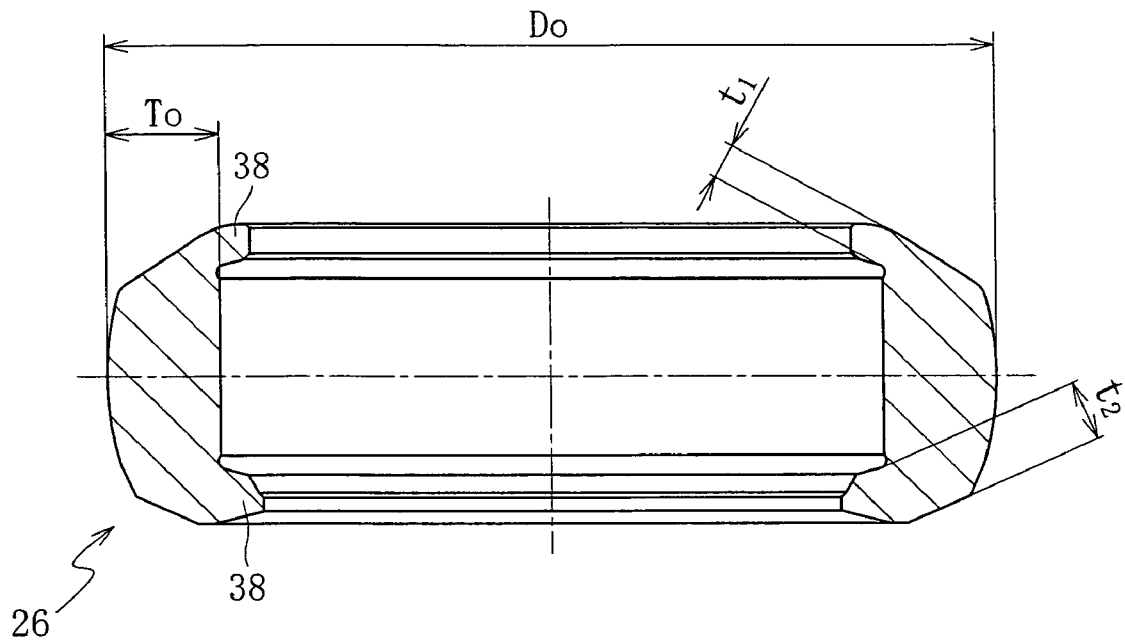
FIG. 6 is a cross-sectional view of an outer roller.
Figure 7:
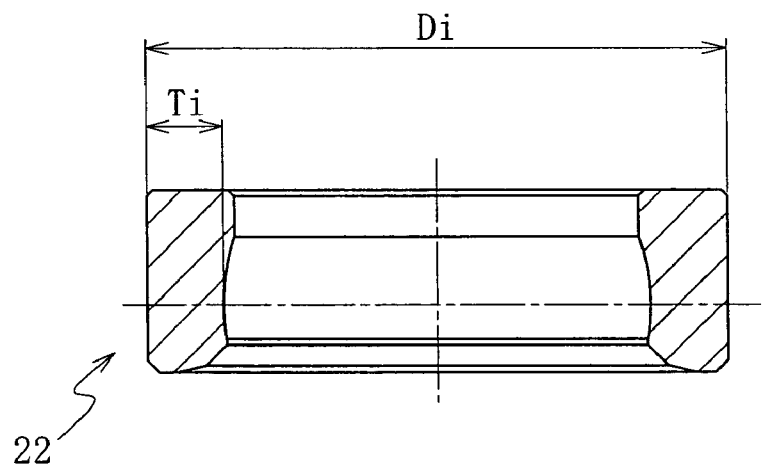
FIG. 7 is a cross-sectional view of an inner roller.

FIG. 3 through FIG. 5 show a basic configuration of a tripod type constant velocity universal joint 11. This constant velocity universal joint 11 is composed of a hollow cylindrical outer joint member 14 which is fixed to the end portion of a first rotary shaft 12 such as a drive shaft, etc. and a tripod (inner joint member) 16 which is fixed to the end portion of a second rotary shaft 13 such as rotary shaft, etc. on the wheel side.

The outer joint member 14 is formed integral with the first rotary shaft 12 by a forging process and has a recessed groove 14a extending in the axial direction at the trisected position in the circumferential direction of the inner circumferential surface thereof. Each recessed groove 14a is recessed from the inner circumferential surface of the outer joint member 14 radially outward and is composed of a pair of guide surfaces 14b facing each other in the circumferential direction and a bottom surface which is located in the radial outside of the outer joint member and connects both guide surfaces 14b. The pair of guide surfaces 14b provide a track on which the outer roller 26, later discussed, is guided in the outer joint member axial direction and roll and transmit torque to the outer roller 26. In addition, to part of the bottom surface of the recessed groove 14a, a guiding shoulder surface 14c that guides rolling of the outer roller 26 is formed. This guiding shoulder surface 14c allows the outer roller 26 to maintain a posture parallel to the outer joint member axial direction when the outer roller 26 travels in the recessed groove 14a and plays a role to smoothly roll the outer roller 26.

The tripod 16 is composed of a boss 16a and a trunnion journal 16b formed integral by forging processing. The boss 16a is fixed to the end portion of the second rotary shaft 13. For example, a spline shaft 25 formed on the second rotary shaft 13 and a spline hole formed on the boss 16a are fitted to each other and positioned with a retaining ring 13a. The trunnion journal 16b protrudes in the radial direction from the circumferential trisected position of the boss 16a. The end of each trunnion journal 16b assumes a spherical shape.

Each trunnion journal 16b supports a roller cassette 20. The roller cassette 20 is of a double roller type composed of an inner roller 22 and an outer roller 26 adapted to rotate relatively via a needle roller 24. In order to prevent slip-out of the needle roller 24, an annular collar 38 is provided for the outer roller 26 on both end sides of the needle roller 24. The inner circumferential surface of the inner roller 22 is a sphere having a radius of curvature nearly the same as that of the spherical outer circumferential surface of the trunnion journal 16b, and the inner roller 22 and the trunnion journal 16b are spherically fitted with each other. By this, the circumference of the spherical outer circumferential surface of the trunnion journal 16b rockably supports the spherical inner circumferential surface of the inner roller 22.

Between the cylindrical outer circumferential surface of the inner roller 22 and the cylindrical inner circumferential surface of the outer roller 26, multiple needle rollers 24 stand. This configuration enables relative rotation and axial displacement of the inner roller 22 and the outer roller 26.

The outer roller 26 is housed in the recessed groove 14a of the outer joint member 14. The pair of guide surfaces 14b that compose each recessed groove 14a is arcuate, and is nearly same as that of the generator of the outer circumferential surface of the outer roller 26 in the transverse cross section (FIG. 3) of the outer joint member 14. Consequently, the outer roller 26 is rotatably supported between a pair of these guide surfaces 14b.

In the event that, for example, the first rotary shaft 12 rotates while the tripod type constant velocity universal joint configured as above is in use, the rotating force is transmitted from the outer joint member 14 to the boss 16a of the tripod 16 via the roller cassette 20 and the trunnion journal 16b and rotates the second rotary shaft 13. Furthermore, in the event that the center shaft of the first rotary shaft 12 and the center shaft of the second rotary shaft 13 are not aligned as shown in FIG. 4, in other words, in the event that the tripod type constant velocity journal joint takes an operating angle, each trunnion journal 16b displaces in the rocking direction with respect to the guide surface 14b of the recessed groove 14a as both rotary shafts rotate while setting the tripod 16 at the center of the displacement. In such event, the outer roller 26 supported by the trunnion journal 16b is displaced in the axial direction of the trunnion journal 16b while it rolls on the guide surface 14b of the recessed groove 14a. These movements, as known, secure the constant velocity between the first and the second rotary shafts 12, 13.

(Shape of the Trunnion Journal)

Figure 1A:
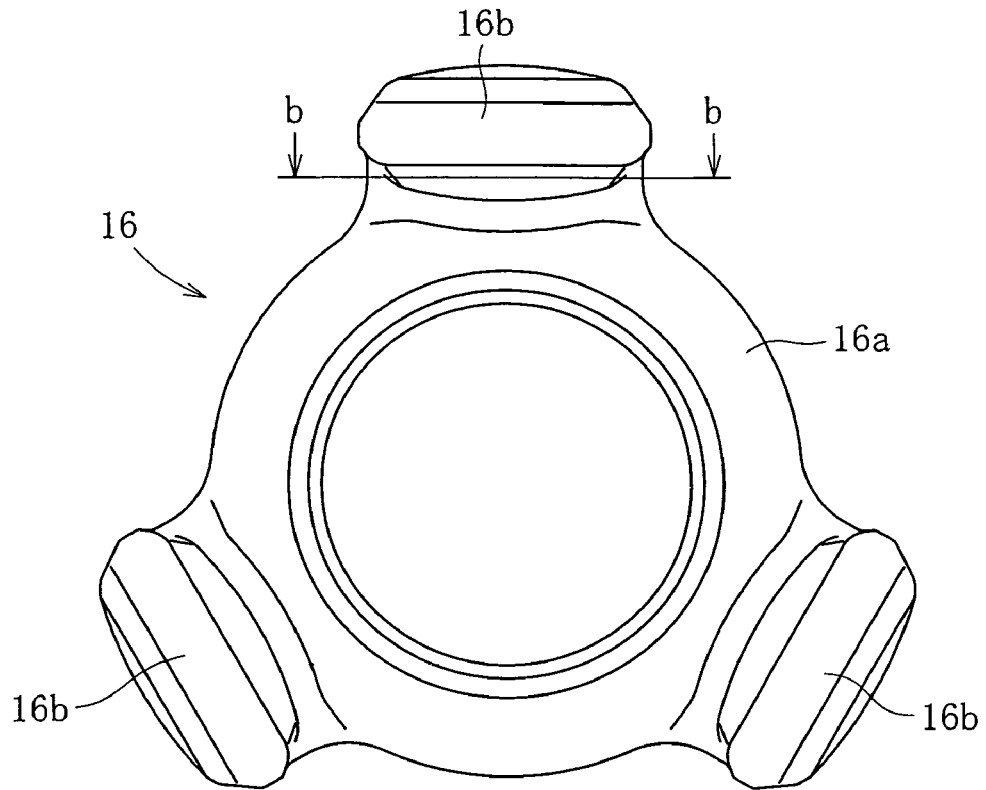
FIG. 1A is a front view of a tripod used for a tripod type constant velocity universal joint according to the present invention and FIG. 1B is a cross-sectional view taken in the direction of the arrows along the line b-b of FIG. 1A.
Figure 1B:
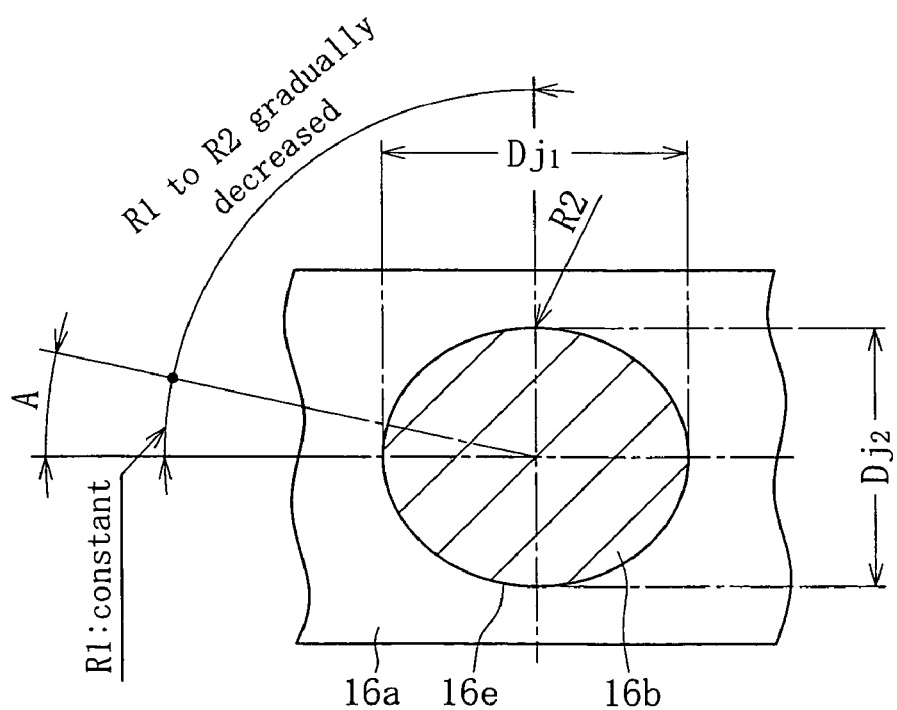

As shown in FIGS. 1A and 1B, the root portion of the trunnion journal 16b is of a noncircular cross section whose diameter in the joint circumferential direction is greater than the diameter in the joint axial direction. This noncircular cross section typically has a shape of an ellipse with the minor axis directed in the joint axial direction as shown in FIG. 1B. Needless to say, it is, possible to apply noncircular cross sections other than the ellipse to the root portion of the trunnion journal 16b. In such event, it is recommendable to make the contour line of the noncircular cross section a smooth continuous curve with care to prevent stress concentration.

By designing the root portion of the trunnion journal 16b to have a noncircular cross section whose diameter in the joint circumferential direction is greater than the diameter in the joint axial direction, the following advantages can be obtained. That is, because the interference undercuts for assembling the journal neck bottom portion with the roller need to exist only on the joint axial direction of the journal neck bottom portion in the event that the roller cassette is tilted in the joint axial direction on the plane surface and assembled to the trunnion journal, no interference undercut for assembly is required for the joint circumferential direction side. At the position in the neck bottom circumferential direction that is likely to be susceptible to the maximum stress when a torque load is received, there is no interference undercut and strength improvement is enabled, and also a more compact joint can be achieved.

Figure 2A:
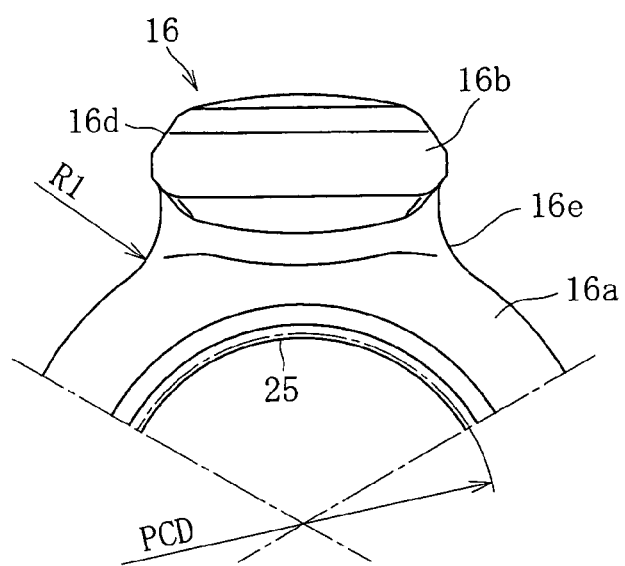
FIG. 2A is a front view of a trunnion journal and FIG. 2B is a side view of the trunnion journal.
Figure 2B:
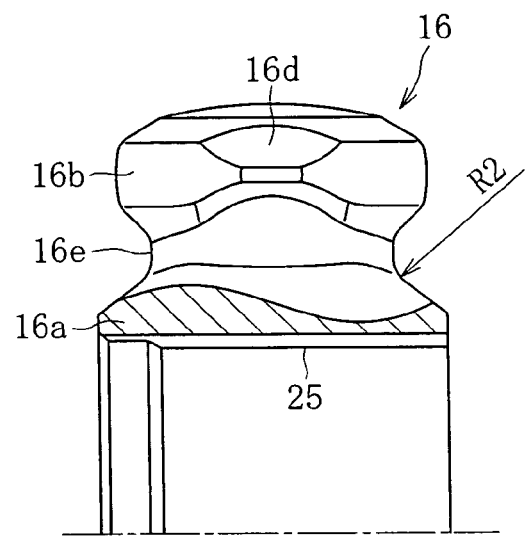

As shown in FIGS. 2A and 2B, assume that the journal root portion 16e which connects the boss 16a with the journal 16b of the tripod 16 is of a recessed arcuate profile, the radius of curvature in the joint circumferential direction (torque load direction) be R1 and the radius of curvature in the joint axial direction be R2, we have R1>R2 and the radius of curvature gradually decreases from R1 to R2.

By this, it becomes possible to provide a lightweight, compact, and low-cost tripod type constant velocity universal joint without sacrificing the maximum operating angle of the joint with the strength of the journal root portion maintained, where the strength of the tripod 16 becomes the weakest.

Let "a" denote the value of the ratio of the radius of curvature R1 in the joint circumferential direction (torque load direction) to the radius of curvature R2 in the joint axial direction. It is desirable to set a to 2.0<a<6.5. In the case of a<2.0, R2 is excessively large and causes the joint to interfere with the roller cassette 20, and the maximum operating angle of the joint decreases; this requires the joint PCD to be increased to avoid interference, possibly resulting in an increase in the joint outside diameter. In the case of a>6.5, R2 is excessively small and forging formability may be degraded.

In addition, let b denote the value of the ratio of the radius of curvature R1 in the joint circumferential direction (torque load direction) to the female spline 25 of the boss 16a PCD; then, it is desirable to set b to 0.13<b<0.25. In the case of b<0.13, R1 is too small and the strength of the tripod 16 may be possibly decreased. In the case of b>0.25, R1 is too large, causing the joint to interfere with the roller cassette 20 and the maximum operating angle of the joint decreases. Consequently, the joint PCD must be increased to avoid interference, and an increased joint outside diameter may result.

In the first embodiment, it is also possible to make the radius of curvature R1 in the joint circumferential direction (torque load direction) of the journal root portion 16e that connects the boss 16a of the tripod 16 with the journal 16b constant throughout the angle range shown with reference character A (FIG. 1B). In such event, the extension of the relevant angle range is gradually reduced to the radius of curvature R2 in the joint axial direction.

Even in the event that the radius of curvature R1 is made constant throughout a specified angle range, it is possible to achieve small size, light weight, and low cost without sacrificing the maximum operating angle of a joint while maintaining strength at the journal root portion 16e, which is most likely to become the weakest portion of the tripod 16. The range of angle A is preferably made larger to the extent which does not exert effects on the maximum operating angle of the joint and is preferably.

By the way, what is indicated by reference character 16d in FIG. 2B is the undercut for assembling the inner roller 22 formed by cutting part of the nearly spherical journal 16b in the joint circumferential direction.

(Optimal Dimensional Ratio of Outer Roller, Inner Roller and Journal Root Portion)

The range of the optimal dimensional ratio of the outer roller 26, inner roller 22 and journal root portion of the tripod type constant velocity universal joint is discussed herein. The "dimensional ratio" is the ratio of the joint to the trunnion journal pitch circle diameter D (=PCD) (see FIG. 5). As any one of the dimensional ratios of components exceeds the lower limit or the upper limit, the strength or rigidity lowers at the portion departing from the dimensional ratio of the tripod type constant velocity universal journal or the joint outside diameter increases, and high strength and compactness are difficult to achieve even if other dimensional ratios are included in the upper and the lower limit ranges of optimum dimensional ratios. Reference characters of dimensions of each portion are shown in FIG. 1B, FIG. 5, FIG. 6, and FIG. 7.

(Assembly of Roller Cassette)

Figure 8:
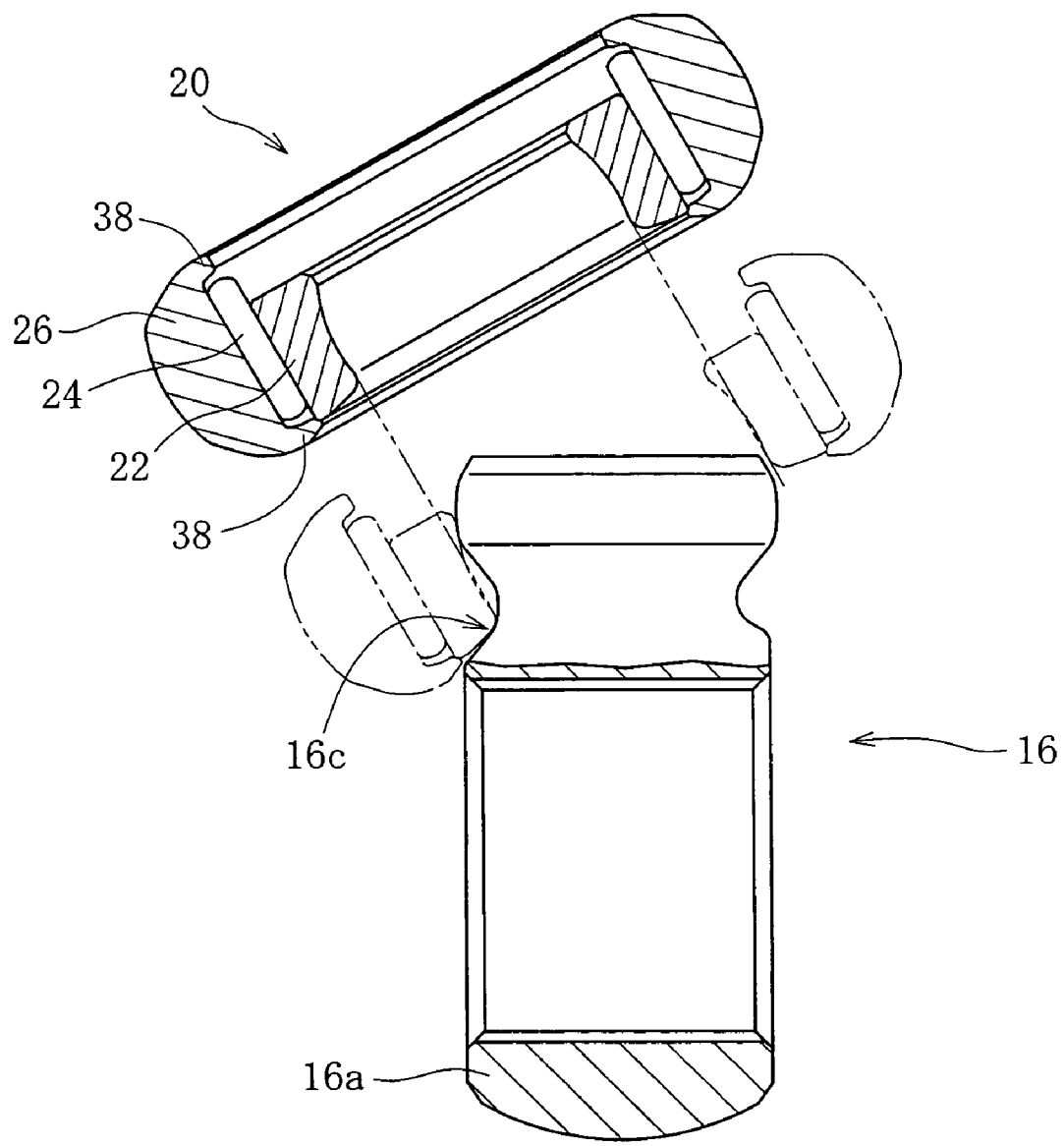
FIG. 8 is a cross-sectional view that explains an assembly procedure of a tripod kit.

FIG. 8 shows the procedure when the roller cassette 20 is assembled to the trunnion journal 16b. As shown in FIG. 8, a large chamfer 16c is provided to the end side (right side of FIG. 4 and left side in FIG. 8) of the second rotary shaft 13 of the boss 16a of the tripod 16. This chamfer 16c and the undercut 16d in the joint circumferential direction discussed before enable the roller cassette 20 to be greatly tilted and assembled as shown by an imaginary line in FIG. 8 when the roller cassette 20 is assembled to the trunnion journal 16b. And because the roller cassette 20 (of the inner roller 22) interferes with the trunnion journal 16b only at opposite two places in the direction to which the torque load is exerted (direction perpendicular to the paper surface of FIG. 8), assembly is enabled by pressing in the inner roller 22 while it is being elasto-deformed.

By the way, the interference undercuts between the trunnion journal 16b and the roller cassette 20 only need to exist at the trunnion journal neck bottom portion in the joint axial direction, and no interference undercuts are required for the trunnion journal neck bottom portion in the joint circumferential direction. Because in the case of this specification, no interference undercuts are required at the neck-bottom circumferential direction that is susceptible to the maximum stress when a torque load is exerted, the strength can be increased and also a more compact tripod type constant velocity universal joint can be obtained. Furthermore, the interference may be avoided by providing a plane surface to two positions (outside the load range), the position to which the torque load of the trunnion journal 16b is exerted and the position in the perpendicular direction.

Because according to the above construction, in the—high-performance type tripod type constant velocity universal joint, the torque is transmitted between the spherical inner circumferential surface of the inner roller 22 and the spherical trunnion journal 16b, the contact surface pressure is suppressed to a low level, which is advantageous from the viewpoint of strength and durability, and at the same time, the neck bottom strength of the trunnion journal 16b is improved; it, therefore, becomes possible to provide a tripod type constant velocity universal joint, which can satisfy all the requirements of high performance, high strength, high durability, and compactness.

As described above, the preferred embodiments of the present invention have been described and illustrated in detail, but it is clearly understood that the present invention shall not be limited to the above-mentioned embodiments but various modifications may be made possible based on the technical ideas expressed in the appended claims.

What is claimed is:

1. A tripod type constant velocity universal joint, comprising:
    an outer joint member being coupled to and adapted to transmit torque to a first rotary shaft and having track grooves extending in an axial direction at trisected positions in a circumferential direction on the inner circumferential surface thereof;
    an inner joint member being coupled to and adapted to transmit torque to a second rotary shaft and comprising a boss directly connected to the second rotary shaft and journals protruding in the radial direction from the circumferentially trisected positions of the boss; and
    a roller cassette lying between the outer joint member and the inner joint member for transmitting torque comprising an outer roller adapted to roll along the track grooves of the outer joint member, an inner roller fitted to the journal of the inner joint member and a plurality of rolling elements disposed between the outer roller and the inner roller,
    wherein Do denotes the outside diameter of the outer roller, To the radial wall thickness of the outer roller, t1 a collar thickness on the outside of the joint radial side of the outer roller, t2 the collar thickness on the inside of the joint radial side of the outer roller, Di the outside diameter of the inner roller, Ti the wall thickness of the inner roller, Dj1 the diameter in the joint peripheral direction of the cross-sectional shape at the joint of a trunnion journal, Dj2 the diameter in a joint axial direction of the cross-sectional shape at the joint trunnion journal, and D the trunnion journal pitch circle diameter (PCD) of the joint;
    wherein an outside diameter ratio of the outer roller Dor=Do/D, wall thickness ratio Tor=To/D, outer collar thickness ratio t1r=t1/D, inner collar thickness ratio t2r=t2/D, outside diameter ratio of inner roller Dir=Di/D, wall thickness ratio Tir=Ti/D, joint circumferential diameter ratio at the joint of trunnion journal Dj1r=Dj1/D, and joint axial diameter ratio at the joint of trunnion journal Dj2r=Dj2/D, and each of the above-mentioned ratios is set to the range of 0.80<Dor<0.90, 0.105<Tor<0.115, 0.025<t1r<0.045, 0.025<t2r<0.075, 0.53<Dir<0.63, 0.065<Tir<0.085, 0.32<Dj1r<0.42, and 0.32<Dj2r<0.35.

2. The tripod type constant velocity universal joint according to claim 1, wherein undercuts for assembling the trunnion journal with the inner roller are provided in the joint circumferential direction on the trunnion journal.

3. The tripod type constant velocity universal joint according to claim 1, wherein a journal root portion of the inner joint member has a noncircular cross section whose diameter in the joint circumferential direction is larger than that in the joint axial direction.

4. The tripod type constant velocity universal joint according to claim 1, wherein the radius of curvature R1 of a journal root portion of the inner joint member in the joint circumferential direction is constant over a specified angle range from the top of the joint circumferential direction.

5. The tripod type constant velocity universal joint according to claim 1, wherein the ratio of radius of curvature R1 in the joint circumferential direction of a journal root portion of the inner joint member to the radius of curvature R2 in the joint axial direction is set to 2.0<a<6.5 where a denotes the value of the ratio of R1 to R2.

6. The tripod type constant velocity universal joint according to claim 1, wherein the ratio of radius of curvature R1 in the joint circumferential direction of a journal root portion of the inner joint member to the female spline PCD of the boss is set to 0.134<0.25 where b denotes the value of the ratio of R1 to PCD.

* * * * *